United States Patent
Matozaki et al.

(10) Patent No.: US 7,679,846 B2
(45) Date of Patent: Mar. 16, 2010

(54) LENS DRIVING DEVICE, OPTICAL PICK UP DEVICE AND ADJUSTING METHOD

(75) Inventors: Toshiya Matozaki, Tokyo (JP); Nobuo Takeshita, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 12/224,309

(22) PCT Filed: Feb. 20, 2007

(86) PCT No.: PCT/JP2007/053056
§ 371 (c)(1),
(2), (4) Date: Aug. 22, 2008

(87) PCT Pub. No.: WO2007/122848
PCT Pub. Date: Nov. 1, 2007

(65) Prior Publication Data
US 2009/0135508 A1 May 28, 2009

(30) Foreign Application Priority Data
Mar. 29, 2006 (JP) ............... 2006-090561

(51) Int. Cl.
*G02B 7/02* (2006.01)
*G11B 7/001* (2006.01)

(52) U.S. Cl. ............. 359/822; 359/823; 369/44.12; 369/44.14; 369/44.16; 369/44.37; 369/112.29

(58) Field of Classification Search ............ 359/819, 359/822–824; 369/44.12–44.16, 44.24, 44.37, 369/112.01, 112.03, 112.29, 120; 356/124, 356/127; 235/454, 462.32, 462.45
See application file for complete search history.

(56) References Cited

U.S. PATENT DOCUMENTS

| | | | |
|---|---|---|---|
| 5,008,873 A * | 4/1991 | Tanaka et al. | 369/44.14 |
| 5,223,970 A | 6/1993 | Oono et al. | |
| 5,313,334 A * | 5/1994 | Tomiyama et al. | 359/824 |
| 5,490,128 A | 2/1996 | Ogata | |
| 5,493,546 A * | 2/1996 | Kasahara | 369/44.15 |
| 5,638,169 A * | 6/1997 | Hollmann et al. | 356/127 |
| 6,111,827 A * | 8/2000 | Miike | 369/44.14 |
| 6,418,108 B1 | 7/2002 | Ueda et al. | |
| 6,459,759 B1 * | 10/2002 | Tominaga | 378/22 |
| 6,625,091 B2 * | 9/2003 | Obara | 369/44.14 |
| 6,932,271 B2 * | 8/2005 | Nakajima et al. | 235/454 |

(Continued)

FOREIGN PATENT DOCUMENTS

EP 1 422 699 A1 5/2004

(Continued)

*Primary Examiner*—Loha Ben
(74) *Attorney, Agent, or Firm*—Birch, Stewart, Kolasch & Birch, LLP.

(57) ABSTRACT

A lens driving device according to the present invention includes a mounting base; a collimation lens that is engaged with the mounting base and movable in optical axis directions; and a driving source that moves the collimation lens in the optical axis directions, and the mounting base includes a fulcrum section with which, when the driving device is mounted on a base, a pitch angle and a roll angle of the driving device are adjusted with respect to the base and the optical axis.

5 Claims, 11 Drawing Sheets

U.S. PATENT DOCUMENTS

| | | | |
|---|---|---|---|
| 7,154,839 B2 * | 12/2006 | Netsu et al. | 369/112.29 |
| 7,209,411 B1 * | 4/2007 | Nakata et al. | 369/44.12 |
| 7,317,675 B2 * | 1/2008 | Nakata et al. | 369/53.28 |
| 7,450,308 B2 * | 11/2008 | Tanaka et al. | 359/618 |
| 2003/0021219 A1 | 1/2003 | Nagai | |
| 2005/0122854 A1 | 6/2005 | Kanou et al. | |
| 2006/0028935 A1 | 2/2006 | Mori et al. | |

FOREIGN PATENT DOCUMENTS

| | | |
|---|---|---|
| JP | 61-150158 A | 7/1986 |
| JP | 2-220228 A | 9/1990 |
| JP | 10-70340 A | 3/1998 |
| JP | 2002-175638 A | 6/2002 |
| JP | 2003-91847 A | 3/2003 |
| JP | 2005-100481 A | 4/2005 |
| JP | 2005-235269 A | 9/2005 |
| JP | 2006-120283 A | 5/2006 |
| WO | WO-84/04991 A1 | 12/1984 |

* cited by examiner

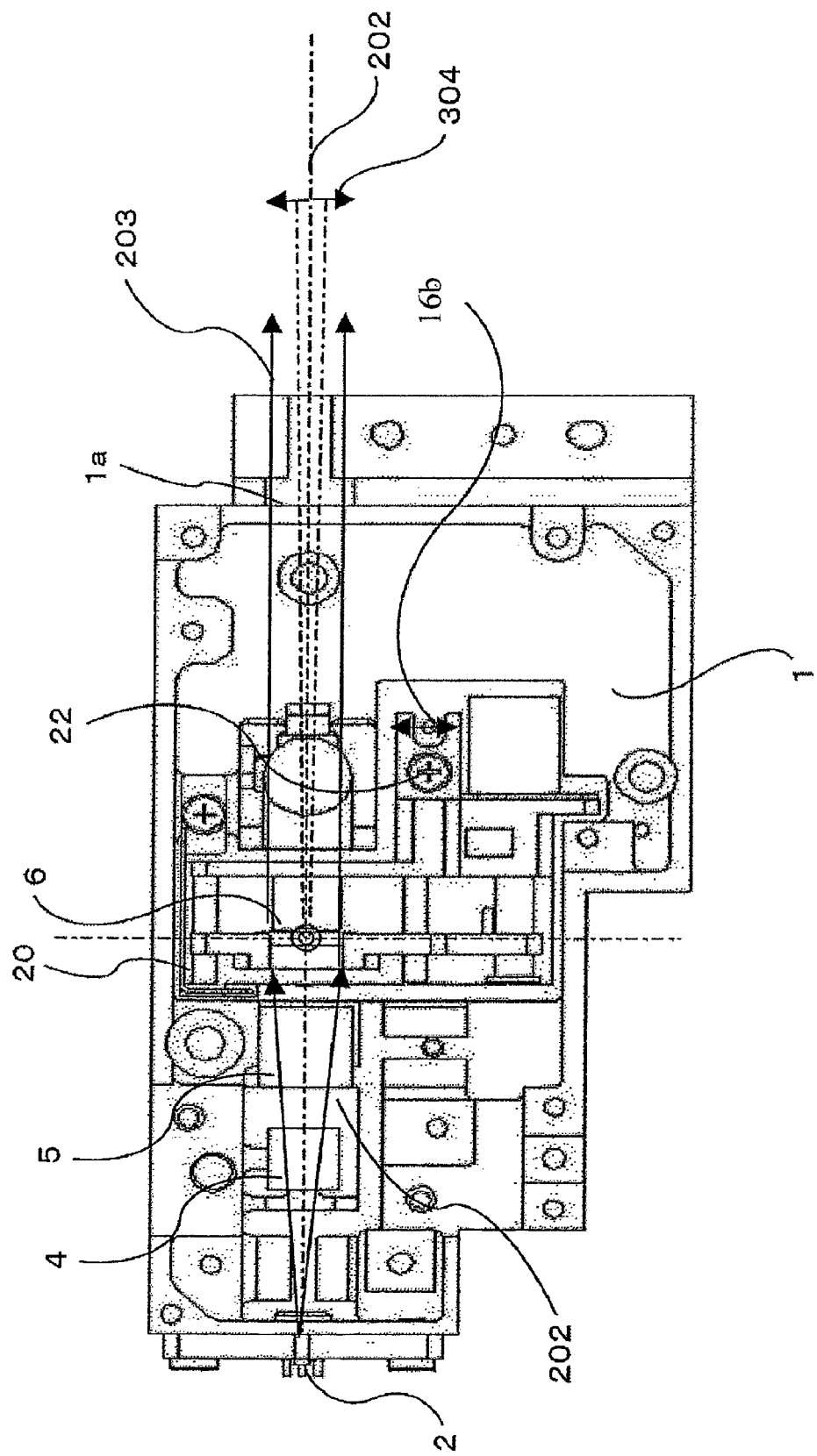

LENS DRIVING DEVICE, OPTICAL PICK UP DEVICE AND ADJUSTING METHOD

TECHNICAL FIELD

The present invention relates to lens driving devices used in optical pick up devices that record and reproduce information on/from optical media such as optical disks and relates to those optical pick up devices. It also relates to mounting and adjusting methods when the lens driving devices are mounted on the optical pick up devices.

BACKGROUND OF THE INVENTION

Typically, a transparent layer is provided on the data recording face of an optical medium to protect the face. In order to correct spherical aberration caused by differences in thickness among transparent layers, a correction method may be sometimes used in a conventional optical pick up device in which a lens driving means moves a collimation lens to correct a convergence-divergence angle of a light beam entering an objective lens. Another correction method may also be used in which a lens driving means moves a beam expanding lens to correct a convergence-divergence angle of a light beam entering an objective lens.

In the above methods, the lens driving means is in most cases configured in such a way that two guide shafts positioned in a casing of the optical pick up device are inserted into a lens moving unit so that a stepping motor positioned in the casing can control the unit movement (Patent Document 1).

Patent Document 1: Japanese Patent Laid-Open Publication No. 2005-100481 (FIG. 1 through 3)

SUMMARY OF THE INVENTION

If the straightness error of the collimation lens is large in the optical pick up device whose focusing system uses a method, as described above, of moving the collimation lens, the collimation lens movement may cause movements of a light beam spot on an optical sensor of an optical sensing system, which results in offsets of sensor signals, affecting playability of the optical pick up system.

Consequently, in order to reduce the straightness error of a collimation lens in conventional optical pick up devices, countermeasures such as making longer the focal length of the collimation lens, making longer the bearing length of a holder supporting the collimation lens, and making longer a span between the guide shafts in the holder and a holder length across which the guide shafts hold the holder, whereby accuracy in straightness of the lens has been mechanically secured. Meanwhile, these countermeasures have caused the structures for holding and supporting the collimation lens to become bulky accordingly. On the other hand, if countermeasures are simply taken to cope with a request for downsizing the device, the span of the holder guide shafts or their length is shortened or the focal length of the collimation lens is made shorter, which arises a problem in that offsets of sensor signals increase.

The present invention has been made to solve the problems described above and aims to provide a lens driving device and an optical pick up device with structures capable of downsizing.

A lens driving device according to the present invention includes:
a mounting base;
a collimation lens that is engaged with the mounting base and movable in optical axis directions; and
a driving source that moves the collimation lens in the optical axis directions, wherein
the mounting base includes a fulcrum section with which, when the driving device is mounted on a base, a pitch angle and a roll angle of the driving device are made adjustable with respect to the base and the optical axis.

As configured above, a lens driving device according to the present invention is capable of being downsized.

BRIEF DESCRIPTION OF THE DRAWINGS

FIG. 9 is a bottom view of the optical pick up device of Embodiment 1;

EXPLANATION OF REFERENCE CHARACTERS

Figure 1:
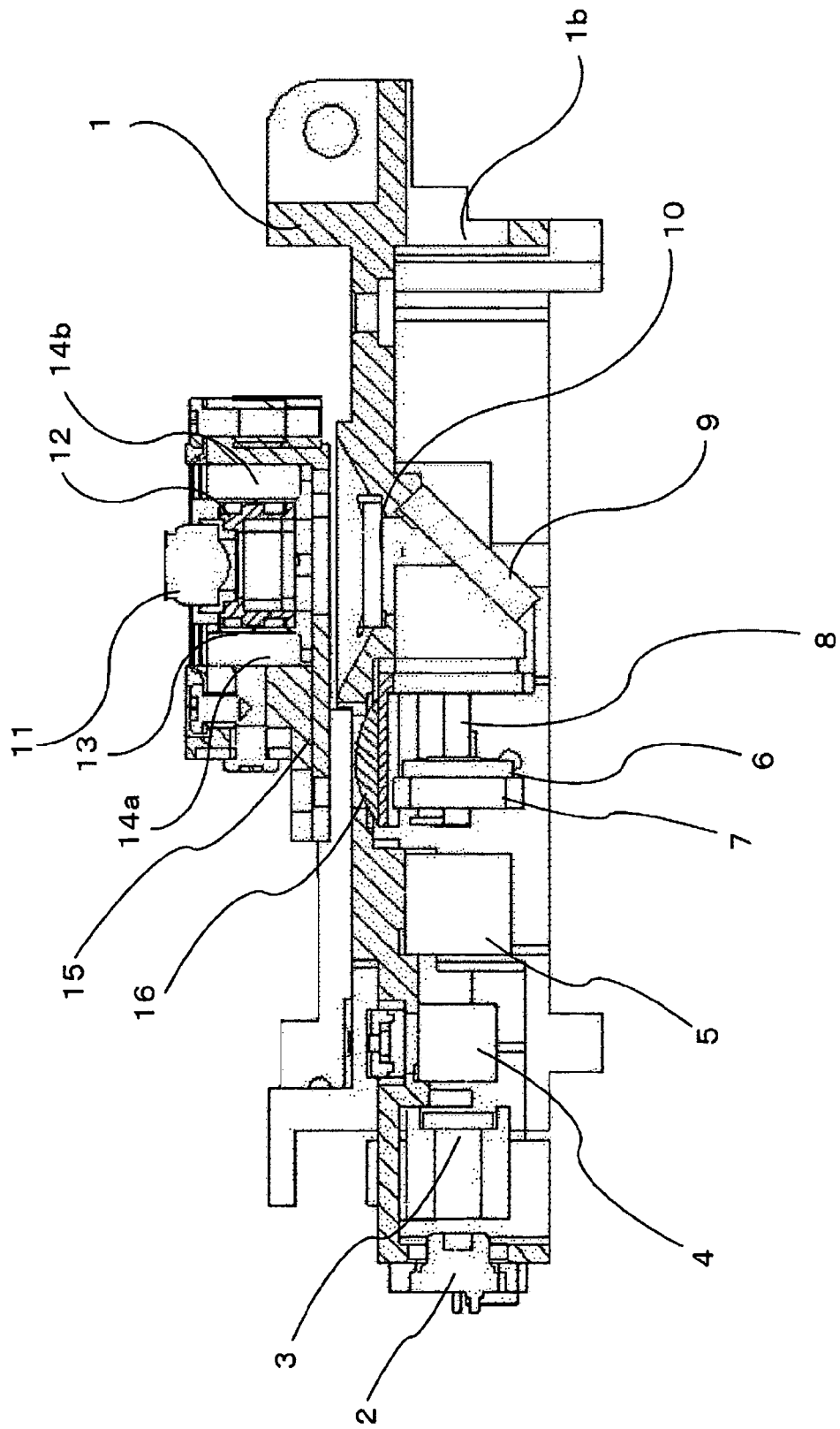
FIG. 1 is a cross-sectional view of an optical pick up device of Embodiment 1.

1 base
1*a* base hole
2 semiconductor laser
3 diffraction grating
4 dichroic prism
5 polarizing prism
6 collimation lens
7 movable holder
8 guide shaft
9 reflection mirror
10 polarization plate
11 objective lens
12 lens holder
13 driving coils
14*a*, 14*b* magnets
15 actuator base
16 mounting base
16*a* anti-rotation guide shaft
16*b* U-shaped adjustment notch
16*c* spherical base section
18 stepping motor
19 threaded stud
20 spring
21 screw
22 screw
24 cylindrical lens 25 optical sensor
100 optical disk
201 luminous point
202 divergent light beam
203 collimated light beam
204 data recording face
205 reflection plane
206 four-division optical sensor
302 optical-axis center line
303 pitch angle
304 roll angle
400 autocollimator
401 collimation lens
402 prism
403 optical sensor
404 monitor
500 protrusion

BEST MODE FOR CARRYING OUT THE INVENTION

Embodiment 1

A lens driving device and an optical pick up device of Embodiment 1 according to the present invention will be explained below, using figures. The lens driving device according to Embodiment 1 has a feature in its structure with which its mounting angles can be adjusted with respect to the optical pick up device.

<Structures of the Lens Driving Device and the Optical Pick Up Device>

FIG. 1 is a cross-sectional view of the optical pick up device on which the lens driving device of Embodiment 1 according to the present invention is mounted.

The lens driving device includes a function to correct spherical aberration caused by differences among transparent layers, which will be described later. Each component of the optical pick up device will be explained, using FIG. 1.

A base 1 is provided with a semiconductor laser 2, a diffraction grating 3, a dichroic prism 4, and a polarizing prism 5. The semiconductor laser 2 emits light as a divergent light beam, which reaches a collimation lens 6 to be converted into a collimated light beam. The collimation lens 6 is fixed to a movable holder 7 which has a structure movable along a guide shaft 8 in the optical axis directions. Together with a motor—a driving source, the collimation lens 6, the movable holder 7 and the guide shaft 8 are mounted onto a mounting base 16, which is adjusted to and fixed on the base 1.

When the focus of the collimation lens 6 coincides with the luminous point of the semiconductor laser 2, transmission light through the collimation lens 6 becomes a collimated light beam. When the collimation lens 6 moves away from the luminous point along the guide shaft 8, the transmission light becomes a convergence light beam; and when approaching, it becomes a divergent light beam.

A light beam converted to a collimated one through the collimation lens 6 is perpendicularly reflected by the reflection mirror 9, passes through a polarization plate 10, enters objective lens 11, and is focused on an optical disk. The objective lens 11 is placed on a lens holder 12. The lens holder 12 is provided with driving coils 13 and supported by a plurality of wires, which supplies electricity to the coils and suspends the lens holder. The amount of current flowing in the driving coils 13 is controlled to generate an acting force in a magnetic field generated by magnets 14a and 14b so that the objective lens 11 is controlled for tracking and focusing controls with respect to a data recording face of the optical disk.

An actuator base 15 is provided with a set of electromagnetic drive components that drive the objective lens 11 in the focusing and the tracking directions, configuring an objective lens actuator, which is fixed to the base 1.

Figure 2:
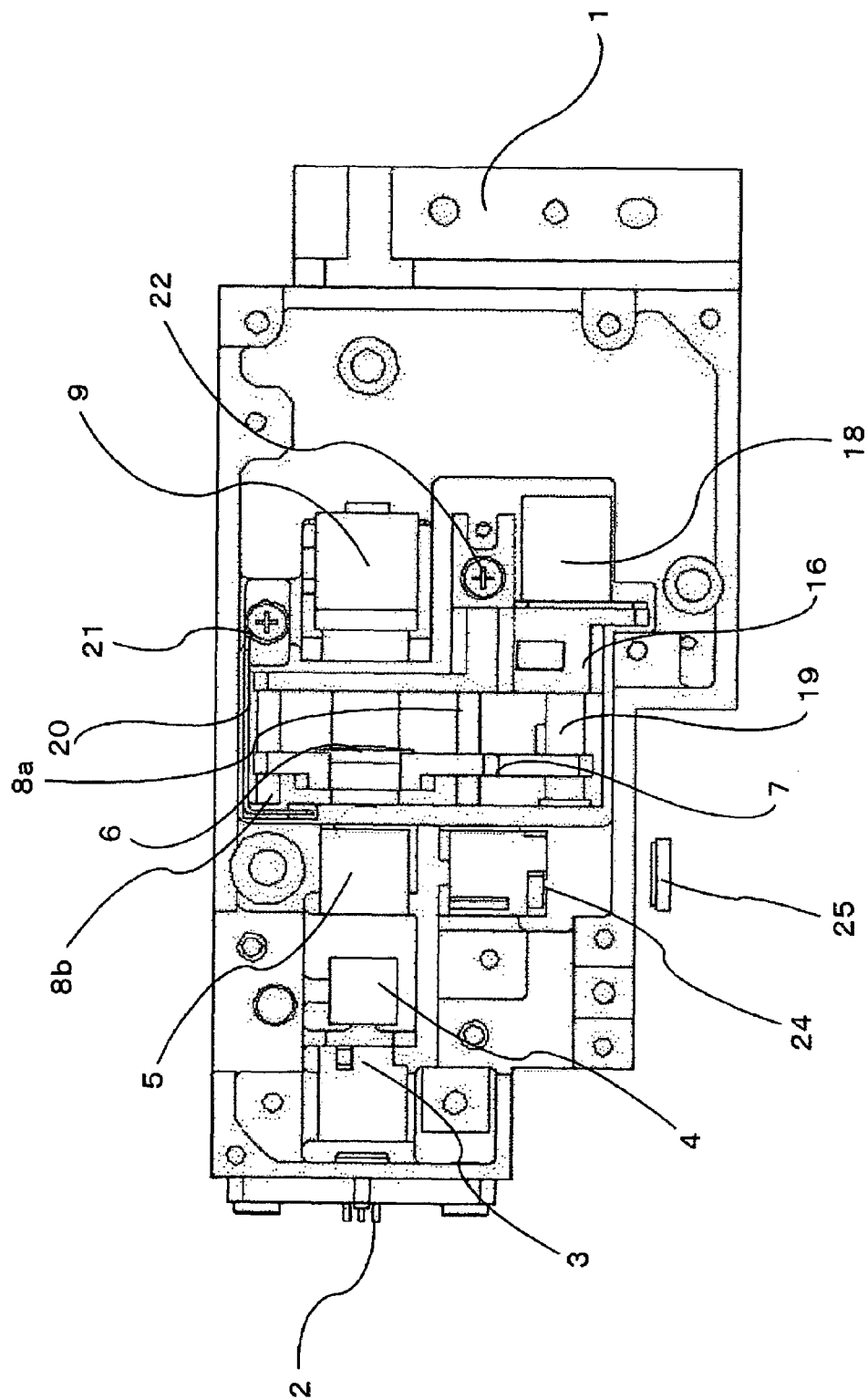
FIG. 2 is a bottom view of the optical pick up device of Embodiment 1.

FIG. 2 is a bottom view of the optical pick up device shown in FIG. 1. As described above, an outgoing light beam from the semiconductor laser 2 passes through the diffraction grating 3, the dichroic prism 4, and the polarizing prism 5; and then, the light beam is converted to a collimated light beam by the collimation lens 6, is reflected by the reflection mirror 9, and enters the objective lens to be focused on the optical disk.

A light beam reflected by the optical disk passes through the objective lens 11 to become a collimated light beam again and returns via the reflection mirror 9 to the collimation lens 6. Then, the light beam is converted to a convergence light beam through the collimation lens 6, turned by the polarizing prism 5, and passes through a cylindrical lens 24 to enter an optical sensor 25. Focusing and tracking control signals for the objective lens actuator and reproduction signals are obtained from the light beam sensed by the optical sensor 25.

Figure 3:
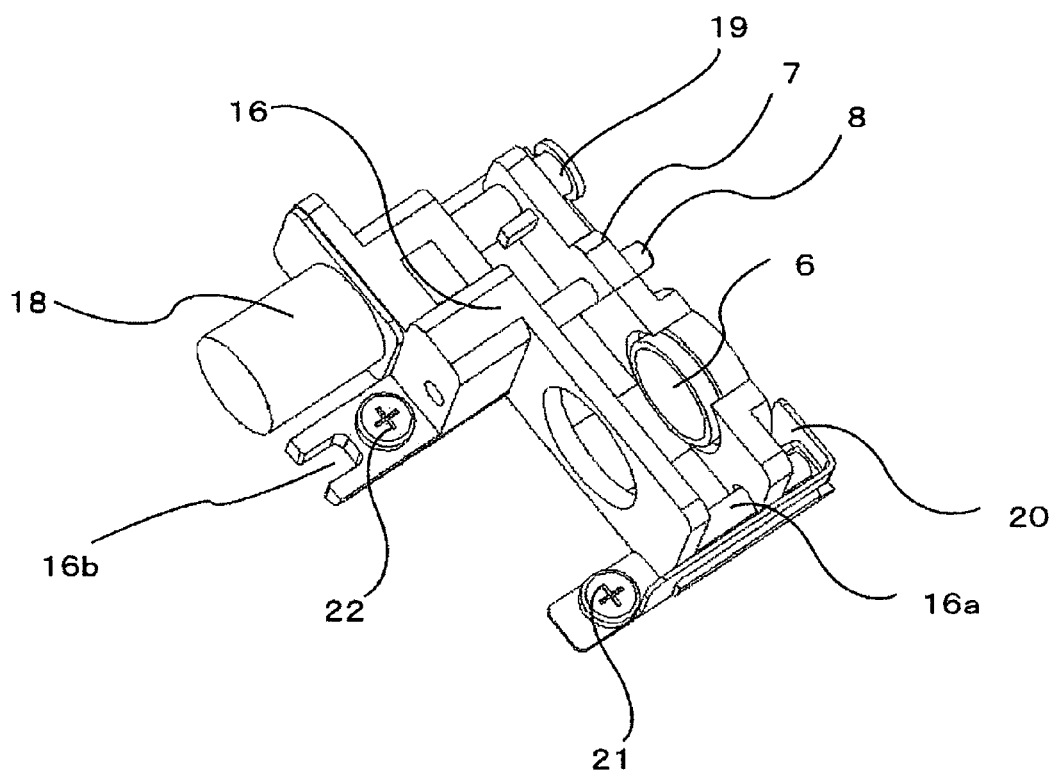
FIG. 3 is a perspective view of a lens driving device of Embodiment 1.

Next, a configuration of the lens driving device mounted on the optical pick up device will be explained, using FIG. 3 and FIG. 4. FIG. 3 is a perspective view for explaining a configuration of the lens driving device. The lens driving device includes, as described above, a function as a spherical-aberration corrector to correct spherical aberration caused by the transparent layers of optical disks.

In the lens driving device, a guide shaft 8 is cantilevered on the mounting base 16 formed by molding. The guide shaft is inserted into the movable holder 7 so that the movable holder 7 accurately slides in the direction along the guide shaft 8.

The collimation lens 6 is provided in the movable holder 7, to which an anti-rotation guide shaft 16a is inserted; and, a threaded stud 19 is provided on a stepping motor 18 as a driving source to engage the holder. The anti-rotation guide shaft 16a is integrally-formed with the mounting base 16 and is approximately parallel to the guide shaft 8. Rotation of the threaded stud 19 transmits driving force to the movable holder 7, which can translate the movable holder 7 and the collimation lens 6.

This lens driving device is fixed to the base 1 of the optical pick up device with a spring 20 and screws 21 and 22. Furthermore, an eccentric pin is inserted into a U-shaped adjustment notch 16b, as described later. In addition, as shown in the figures, a leaf spring is used as the spring 20.

Figure 4:
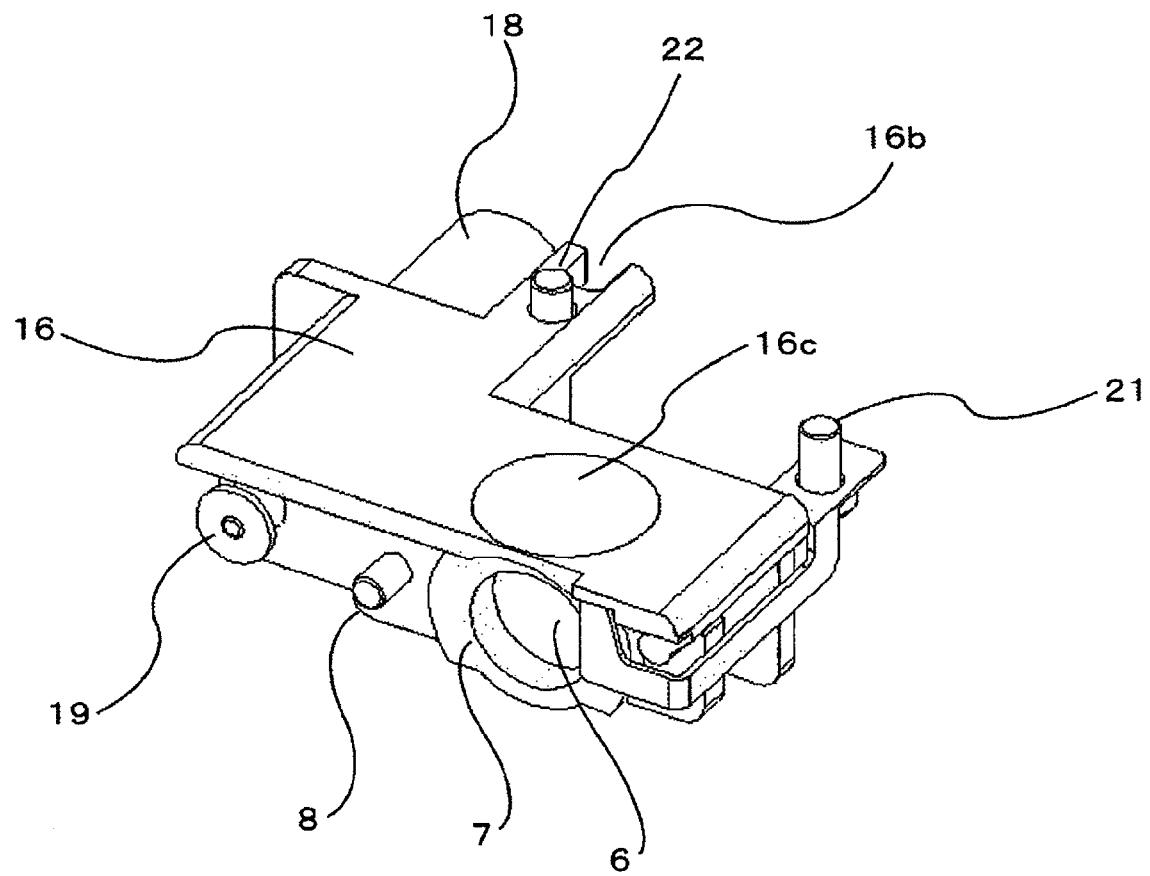
FIG. 4 is another perspective view of the lens driving device of Embodiment 1.

FIG. 4 is another perspective view of the device, viewed from the opposite side of that viewed in FIG. 3. As shown in FIG. 4, a spherical seat 16c is formed on a side of the mounting base 16, which is an opposite side of that shown in FIG. 3. The spherical seat 16c is positioned in accordance with a hole or a concave portion in the base 1 of the optical pick up device, then the lens driving device is fixed to the optical pick up device with the spring 20 and the screws 21 and 22.

As described later, the lens driving device has such a structure that a pitch angle and a roll angle can be adjusted with respect to a light beam of a light condensing system in the optical pick up device. More specifically, as shown in the figures, a weighted point by the spring 20 and the position of the screw 22 are oppositely positioned across the spherical seat 16c, and the pitch angle is adjusted by adjusting the height of the projection part of the screw 22. The roll angle is adjusted in such a way that the eccentric pin is inserted into the U-shaped adjustment notch 16b and turned to rotate the lens driving device with the spherical seat 16c being a rotation axis.

That is, the spherical seat 16c serves as a fulcrum section of the lens driving device with respect to the optical pick up device.

<Effects of Straightness Error of Collimation Lens>

Figure 5:
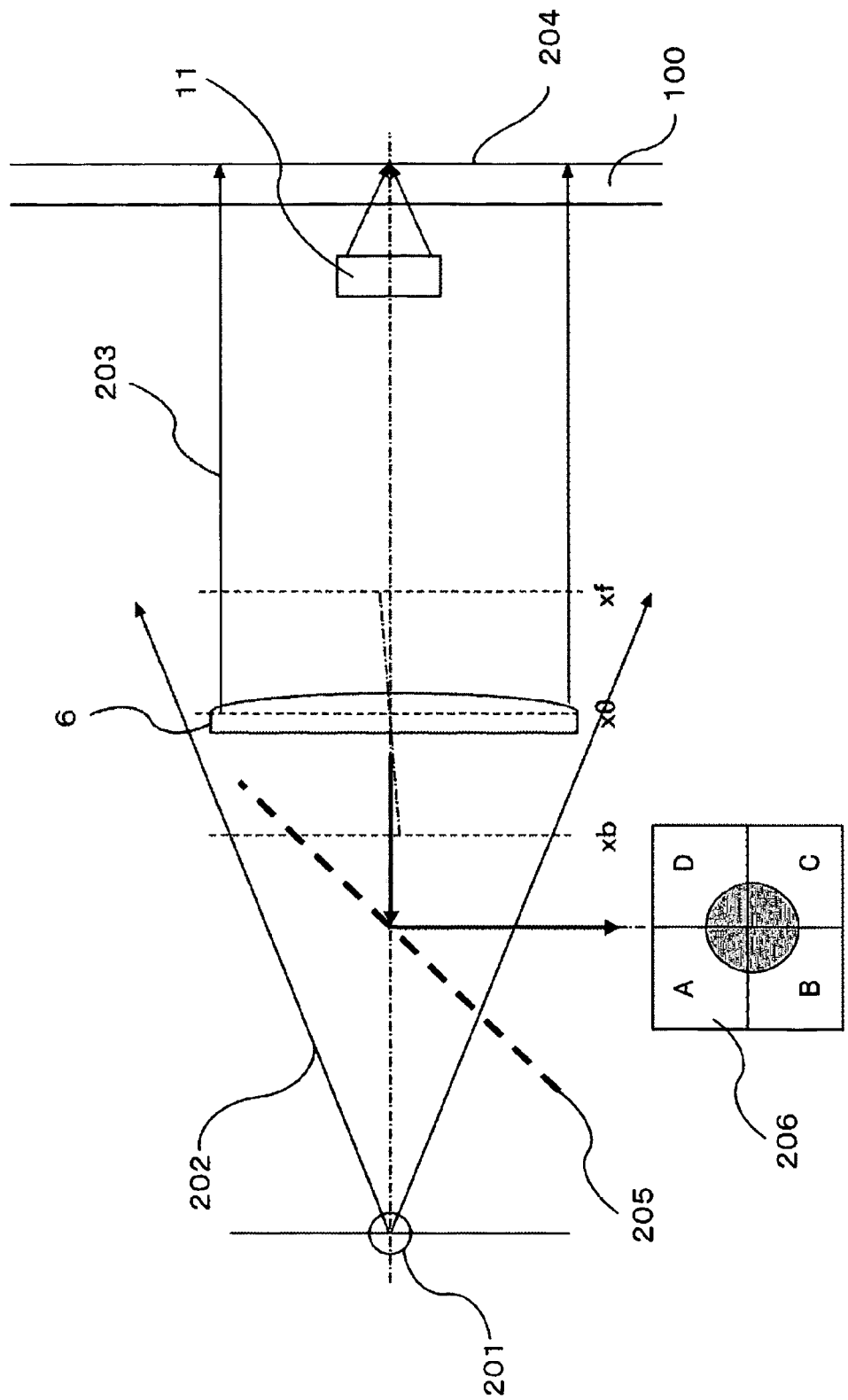
FIG. 5 is an illustration for effects of straightness error of a collimation lens.

Next, how straightness error of the collimation lens influences will be explained, using FIGS. 5 through 7. FIG. 5 shows a reference case in which the principal point of the collimation lens 6 is positioned at the middle point along the light beam axis.

In FIG. 5, the luminous point 201 of the semiconductor laser emits a divergent light beam 202, and the collimation lens 6 is positioned at such a position X0 that the position of the luminous point 201 coincides with the focal point of the lens. The collimation lens 6 converts the beam to a collimated light beam 203, which is narrowed by the objective lens 11 positioned in the collimated light beam, then passes through a transparent layer 100 of the optical disk, and is focused on the data recording face 204. Then, a light beam reflected by the data recording face 204 is perpendicularly turned by a reflection plane 205 which is inclined by 45 degrees and schematically expresses an optical-path turning mirror, and is focused on a four-division optical sensor 206.

A light sensing surface of the four-division optical sensor 206 is divided into regions A, B, C, and D, as shown in the figure; and when the collimation lens is positioned at the reference position shown in FIG. 5, the position of the sensing surface is adjusted and fixed so that the amount of light beam incident on (the region A+the region C) equals that on (the region B+the region D). In addition, a cylindrical lens, not illustrated in the figures, is disposed in front of the four-division optical sensor 206. This cylindrical lens functions to generate an astigmatism amount corresponding to a defocusing amount between the objective lens 11 and the data recording face 204. When the cylindrical lens generates astigmatism, the figure of a light collecting spot on the four-division optical sensor 206 is deformed in A-C directions or B-D directions. Thus, according to the light beam amount difference of (A+C)−(B+D), the four-division optical sensor 206 senses the defocusing amount between the objective lens 11 and the data recording face 204.

The optical pick up device performs focusing control of the objective lens 11 by performing feedback control of an actuator, driving the objective lens 11, so as to reduce to zero a sensing signal value that is outputted from the four-division optical sensor 206 and corresponds to the light amount difference (A+C)−(B+D).

Next, using FIG. 6, another case will be explained in which the collimation lens 6 has been moved toward the optical disk. As shown in the figure, the collimation lens 6 has been moved from the reference position X0 to a position Xf being closer to the optical disk 100. In FIG. 6, the travel distance of the light beam through the transparent layer of the optical disk 100 is shorter than that in FIG. 5, and the data recording face 204a is positioned closer to the collimation lens 6. Therefore, the optical pick up device moves the collimation lens 6 toward the optical disk to correct spherical aberration caused by the differences among the travel distances through the transparent layers, whereby a convergence light beam 203a enters into the objective lens 11 to be focused on the data recording face 204a.

Figure 6:
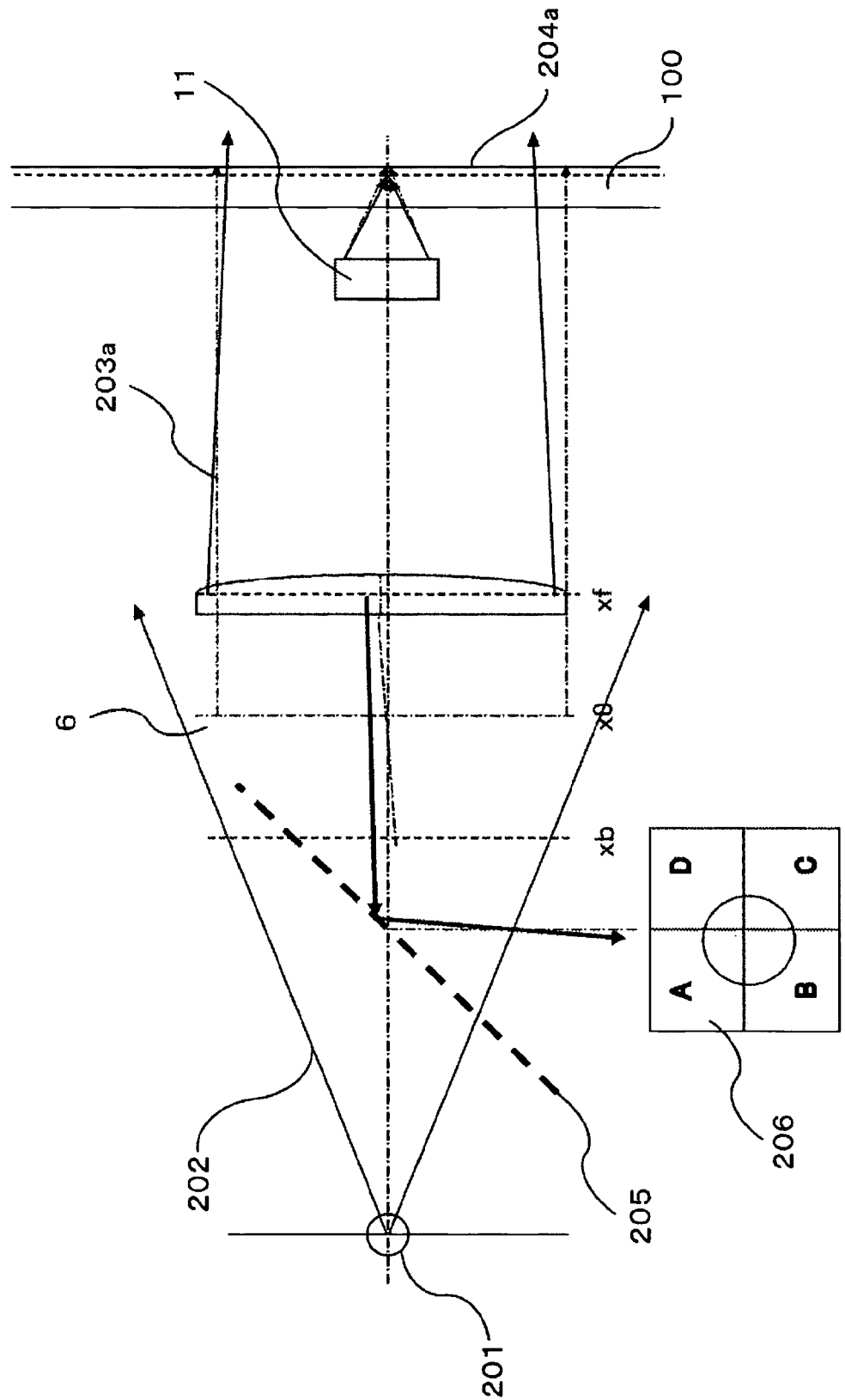
FIG. 6 is another illustration for effects of straightness error of the collimation lens.

When the collimation lens 6 is moved, as shown in FIG. 6, with its principal point displaced from a reference line, a reflection light beam from the optical disk 100 is incident upon the reflection plane 205 at an angle. Thus, the position of the light collecting spot shifts on the four-division optical sensor 206.

As described above, the focusing control of the objective lens 11 is performed with respect to the data recording face 204a of the optical disk 100 in such a way that the position of the objective lens is controlled so as to reduce to zero a sensing signal value that is outputted from the four-division optical sensor 206 and corresponds to the light amount difference (A+C)−(B+D). Therefore, when an offset of the light collecting spot is produced due to the factors as described above, it is impossible to control the objective lens 11 correctly to a focusing position.

Next, using FIG. 7, another case will be explained, in which the collimation lens 6 has been moved away from the optical disk. As shown in the figure, the collimation lens 6 has been moved from the reference position X0 to a position Xb away from the optical disk 100.

Figure 7:
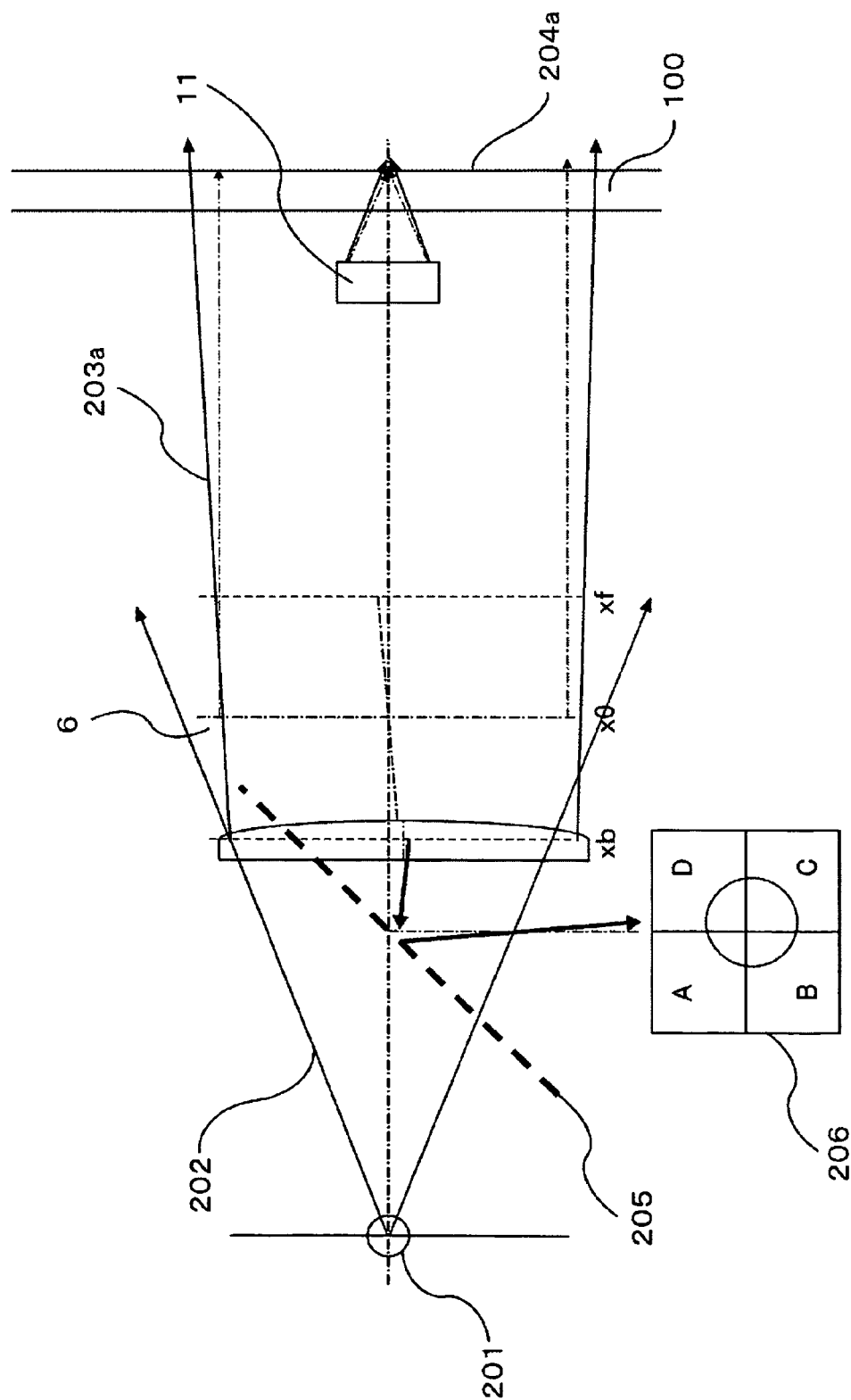
FIG. 7 is another illustration for effects of straightness error of the collimation lens.

In FIG. 7, the travel distance of the light beam through the transparent layer of the optical disk 100 is longer than that in FIG. 5, and the data recording face 204a is positioned farther from the collimation lens 6. Therefore, the optical pick up device moves the collimation lens 6 away from the optical disk to correct spherical aberration caused by the differences among the travel distances through the transparent layers, whereby a convergence light beam 203a enters into the objective lens 11 to be focused on the data recording face 204a.

When the collimation lens 6 is moved, as shown in FIG. 7, with its principal point displaced from the reference line, the reflection light beam from the optical disk 100 is incident upon the reflection plane 205 at an angle. Thus, the position of the light collecting spot shifts on the four-division optical sensor 206.

As a result, similarly to the case in FIG. 6, an offset of the light collecting spot does not allow the objective lens 11 to be controlled to a correct focusing position.

Consequently, the lens driving device according to the present embodiment has a structure with which its pitch angle and roll angle can be adjusted with respect to the optical axis when the device is mounted on the optical pick up device. Therefore, even when the collimation lens 6 is moved, displacement errors with respect to the optical axis—such as those explained in FIG. 6 and FIG. 7—are reduced to curb straightness errors. Hereinafter, explanations will be made about how to mount the lens driving device on the optical pick up device and how to adjust straightness errors of the device, using figures.

Figure 8:
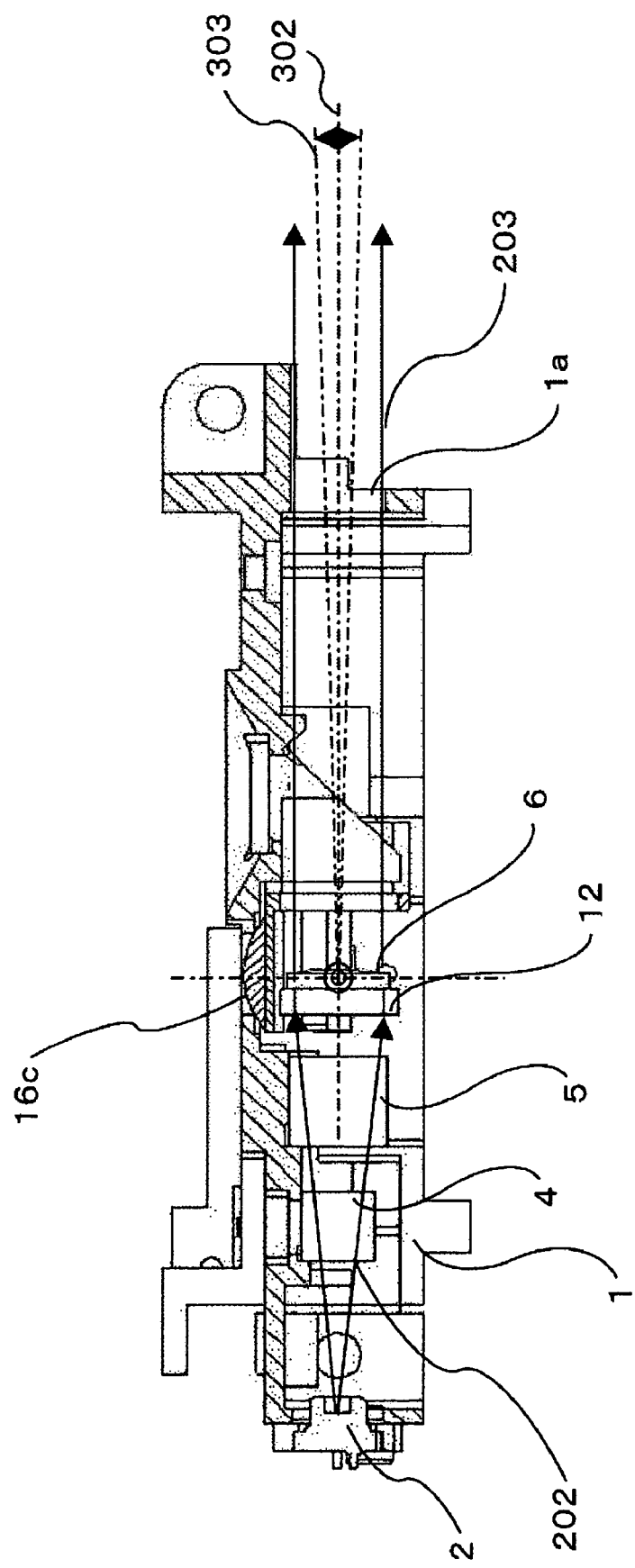
FIG. 8 is a cross-sectional view of the optical pick up device of Embodiment 1.

FIG. 8 is a cross-sectional view of the optical pick up device for explaining its optical system. As shown in the figure, the semiconductor laser 2 provided on the base 1 emits the divergence light beam 202, which is converted to the collimated light beam 203 by the collimation lens 6.

The collimation lens 6 is mounted on the base 1 by means of the spherical seat 16c of the mounting base. When this lens driving device is mounted, the position of the collimation lens 6 has been adjusted so that the principal point thereof coincides with the spherical center of the spherical seat 16c. That is, the collimation lens 6 is positioned so that a plane perpendicular to the optical axis includes the spherical center of the spherical seat 16c and the principal point of the collimation lens 6. Therefore, a plane including the optical axis, where the principal point of the collimation lens 6 is positioned, and the spherical seat 16c is approximately perpendicular to a mounting surface of the base of the optical pick up device.

Because the collimation lens 6 is positioned described above, the lens driving device can be adjusted with a pitch angle 303 whose vertex is at the principal point of the collimation lens 6 as shown FIG. 8. The pitch angle is adjusted by adjusting the height of the projection part of the screw 22. In addition, as shown in the figure, the collimated light beam 203 from the collimation lens 6 passes through a base hole 1*a* of the base 1 that is opened in the beam traveling direction, so that the beam can be observed.

FIG. 9 is a bottom view of the optical pick up device shown in FIG. 8. Because the collimation lens 6 is positioned described above, the lens driving device can be adjusted with a roll angle 304 whose vertex is at the principal point of the collimation lens 6 shown FIG. 9. The roll angle 304 is adjusted by turning and adjusting the eccentric pin inserted in the U-shaped adjustment notch 16*b*.

Figure 10A:
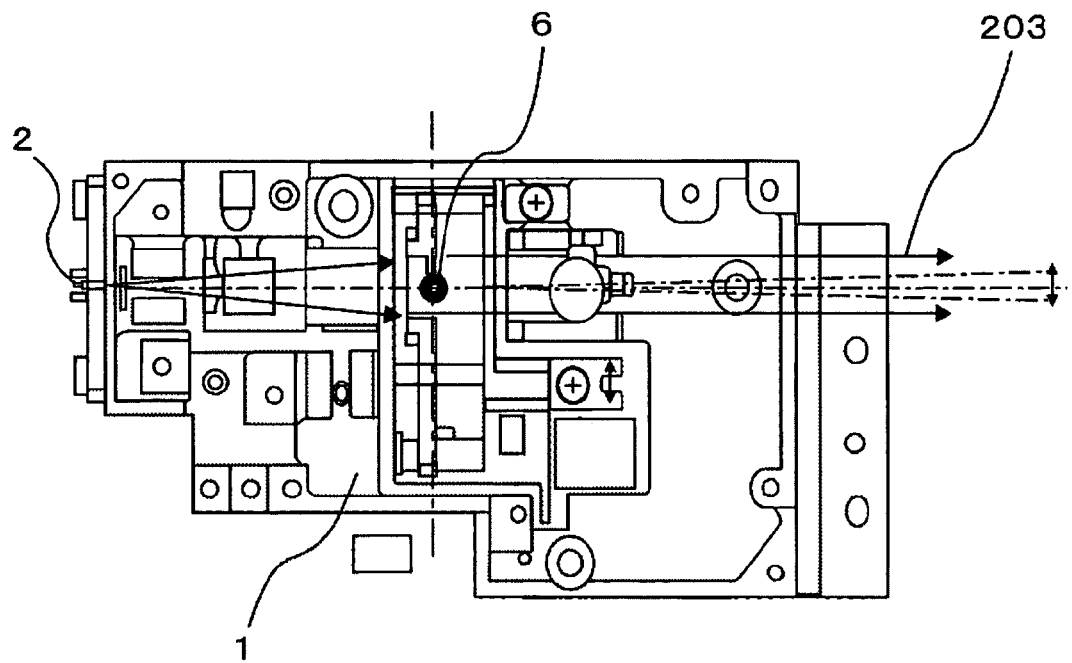
FIG. 10 includes illustrations for a method of adjusting the collimation lens of Embodiment 1.
Figure 10B:
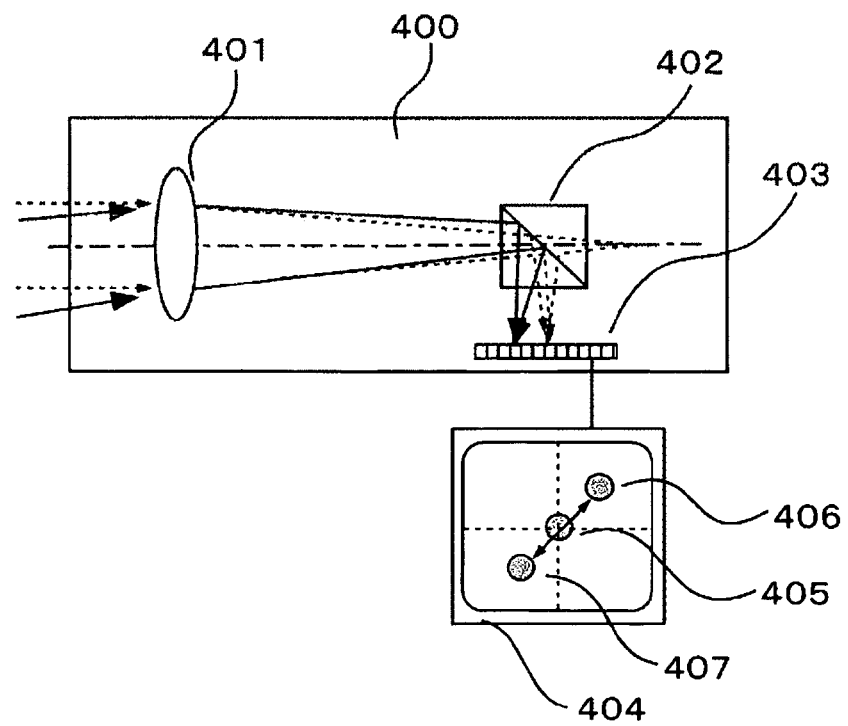

FIG. 10 are illustrations for a method of adjusting straightness error of the collimation lens. In the figures, the collimation lens 6 converts the beam to a collimated light beam 203, which passes the base hole 1*a* of the base 1 and enters an autocollimator 400. The autocollimator 400 monitors the incident angle of the collimated light beam 203.

Components and functions of the autocollimator 400 will be explained. The collimated light beam 203 entering the autocollimator 400 is converged by a collimation lens 401; then, its optical path is turned by a prism 402; and the light beam is led to a two-dimensional optical sensor 403 such as a CCD. On a monitor 404, the incident angle of the light beam can be observed with respect to the reference position by obtaining outputs from the two-dimensional optical sensor 403.

Procedure for adjusting straightness error of the collimation lens is as follows. Firstly, the reference position of the autocollimator 400 is adjusted to be on an optical axis joining the luminous point of the semiconductor laser 2 to the principal point of the collimation lens 6. Thereby, a light beam can be observed on the monitor 404 as an initial position 405. Secondly, the collimation lens 6 is moved forward within a movable range. This is the same movement as that performed when the lens is moved to approach the optical disk during actual reproducing and recording operations. If the lens driving device moves the collimation lens 6 with zero straightness error, there are no displacements of the optical axis that has been initially adjusted, whereby the collimated light beam 203 from the base 1 is observed on the monitor 404 as the initial position 405 without any displacements.

On the other hand, if there is a deviation in straightness error, the irradiation angle of the collimated light beam 203 is varied, so that the light beam is observed on the monitor 404 of the autocollimator 400 at such a position that is displaced apart from the initial position 405 to a position 406, a position 404 or the like according to its varied direction. Similar displacements are similarly observed when the collimation lens 6 is moved backward within the movable range. That is, if the straightness error of the lens driving device is zero, the light beam is always observed in the initial position 405; and if there exist deviations in the straightness error, the light beam is displaced.

Consequently, straightness error of the lens driving device is to be corrected in such a way that the pitch angle and the roll angle of the lens driving device are adjusted, using the autocollimator 400, so that the incident angle of the collimated light beam 203 has no deviations to be observed on the monitor 404.

That is, firstly, the collimation lens 6 of the lens driving device is positioned so that a plane perpendicular to the optical axis includes the spherical center of the spherical seat 16*c* and the principal point of the collimation lens 6; then, considering the spherical center of the spherical seat 16*c* to be the vertices of the angles positionally fixed with respect to the base 1, the pitch angle and the roll angle are adjusted with respect to the optical axis. Next, the collimation lens 6 is moved in the beam traveling direction; then, adjustments of the angles are made in the same manner, considering the spherical center of the spherical seat 16*c* to be the fixed vertices. Furthermore, the collimation lens 6 is moved in a direction opposite to the beam traveling direction to adjust the angles.

By this adjustment method, straight-line movement in the lens driving device can be secured with high precision. Therefore, the countermeasures taken in conventional lens driving devices, such as making longer the bearing length of a holder for supporting the collimation lens and making longer a holder guide shaft's span or its length, become unnecessary, which enables the devices to be downsized.

Straight-line movements with high precision are needed to lens driving devices especially when reproducing from and recording to optical disks having thin transparent layers and when recording and reproducing with a high density. Straight-line movements are also needed when the wavelength of light is short and when an objective lens with a high aperture ratio is used. A lens driving device and an optical pick up device according to the present embodiment can be configured with structures smaller than those of conventional ones and provide high precision straight-line movement of the collimation lens with a method easier than those used in conventional ones.

In the Blu-ray disc system, the wavelength of a light beam is approximately 400 nm and objective lenses having an aperture ratio of approximately 0.85 are typically used. On the other hand, in DVD systems, the wavelength of a light beam is approximately 650 nm and objective lenses having an aperture ratio of approximately 0.6 are frequently used. Furthermore, a transparent layer for the Blu-ray disc system has a thickness of approximately 0.1 mm, which is much thinner than that of approximately 0.6 mm to 1.2 mm for DVD systems. Consequently, application of a lens driving device according to the present embodiment to the Blu-ray disc system is very advantageous.

In the present embodiment, although a base hole 1*a* is opened on a casing of a base 1 that is positioned on the light beam traveling path, the position of the base hole is not limited to that one and any position may be used as long as the light beam having passed through the collimation lens can be observed. That is, the light beam having passed through the collimation lens may be observed after it is reflected by a mirror or the like.

Embodiment 2

Figure 11:
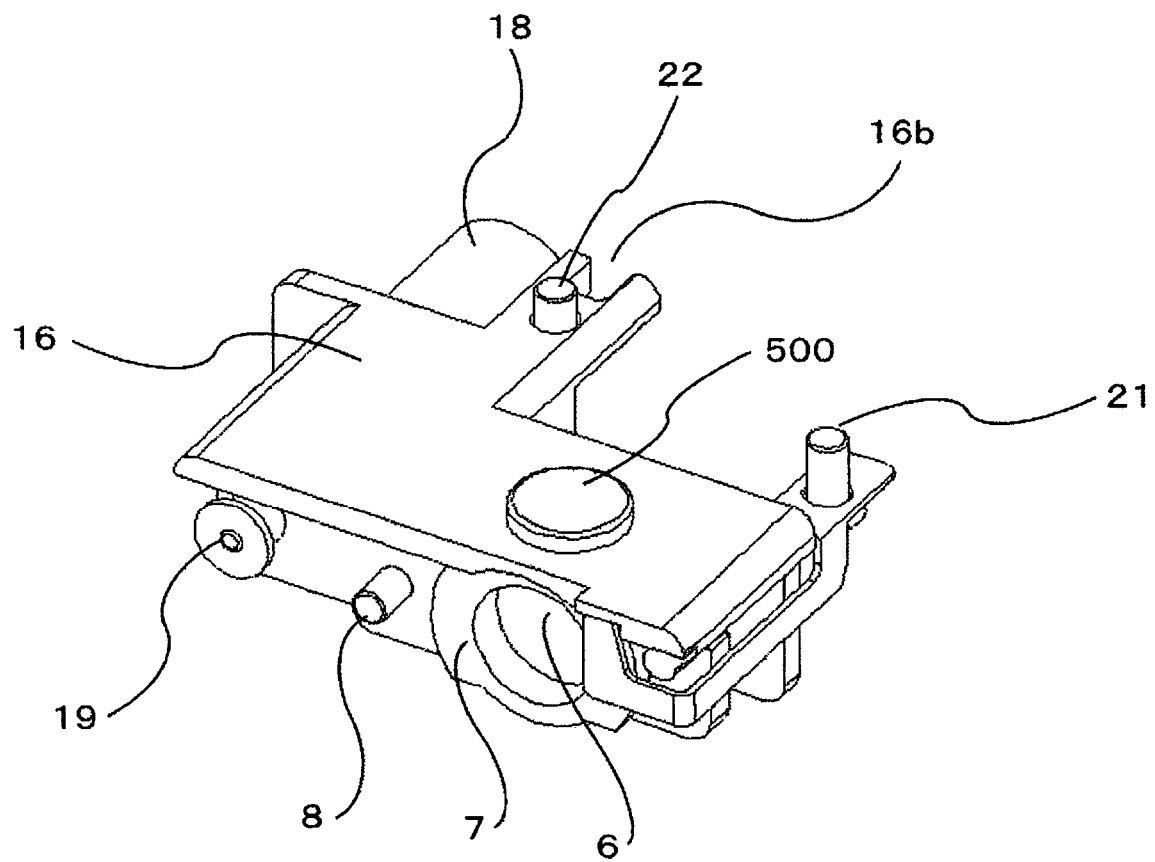
FIG. 11 is a perspective view of a lens driving device of Embodiment 2.

FIG. 11 is a perspective view for explaining a lens driving device according to Embodiment 2, which view corresponds to that for Embodiment 1 shown in FIG. 4. As obviously shown in the figure, the lens driving device according to the present embodiment has a feature in that a cylindrical protrusion 500 is integrally formed with a mounting base 16.

A base 1 of an optical pick up device has a spherical concave portion that opposes to the protrusion 500. The spherical center of the spherical concave portion is positioned on the central optical axis of the collimation lens.

Then, the cylindrical protrusion 500 is fitted onto the concave portion, which is configured in a spherical shape on the base 1, to be fixed with a spring 20 and screws 21 and 22. Since detail adjustment procedures hereinafter are the same as those in Embodiment 1, explanations will be omitted.

As described above, adjustment can also be made similarly to that in Embodiment 1, by fitting a cylindrical protrusion of the lens driving device to a spherical concave, provided on the base of the optical pick up device, whose center is positioned on the central optical axis of the collimation lens.

Although it has been explained in Embodiment 1 and Embodiment 2 in which a protrusion, as such a spherical seat and a cylindrical protrusion, is provided on a mounting base, the shape of the protrusion is not limited to these shapes. As long as the lens driving device has a structure with which a pitch angle and a roll angle can be adjusted with respect to the optical axis, any shape may be used, for example, a prism, a cone, and a triangular pyramid.

It has been explained that protrusions of the spherical seat and the cylindrical protrusion are integrally formed with the mounting base; however, they may be produced as separated parts.

It has been explained that adjustments of the lens driving device are made at three positions—the reference position, a forward position and a backward position in the movable range; however, adjustments may be made at any two positions of them.

It has been explained that a lens driving device is mounted on an optical pick up device; however, it may be mounted on a part (attachment member) that is separated and different from the main body of the optical pick up device. The lens driving device may be fixed to the separated part, and then the separated part may be fixed to the optical pick up device; otherwise, the separated part may be fixed to the optical pick up device, and then the lens driving device may be fixed to the part.

The U-shaped adjustment notch 16b has been in a slit-like shape; however, as long as the shape of the notch has two faces approximately parallel to the optical axis, any shape of the notch may be used, such as a hole in an oblong shape.

A leaf spring has been used for the spring 20; however, a coil spring or an elastic body such as rubber, may be used as long as they are elastic.

What is claimed is:

1. A lens driving device, comprising:
    a mounting base;
    a collimation lens that is engaged with the mounting base and movable in directions of an optical axis; and
    a driving source that moves the collimation lens in the optical axis directions, wherein the mounting base includes
    a fulcrum section with which the driving device is mounted to a base, and with which a pitch angle and a roll angle of the driving device are made adjustable with respect to the optical axis when the driving device is mounted;
    a spring that is in contact with the base; and
    a hole that is provided in a position on the opposite side, with respect to the optical axis, of the spring and through which a screw passes for fixing to the base, and the pitch angle is made adjustable by adjustment of the screw.

2. An optical pick up device on which the lens driving device according to claim 1 is mounted, comprising:
    a casing having an opening that is provided on the casing to observe a light beam emitted by a light beam source and passing the collimation lens.

3. The optical pick up device according to claim 2, wherein the opening is provided on an extension of the optical axis.

4. A method of adjusting a mounting position when mounting a lens driving device on an optical pick up device, both as set forth in claim 2, wherein either the pitch angle or the roll angle, or both the angles concerning the mounting position are adjusted in each of the following positions:
    (A) a reference position in which a plane including a spherical center of the fulcrum section and a principal point of the collimation lens is perpendicular to the optical axis,
    (B) a position to which the collimation lens has been moved forward along the light beam traveling, and
    (C) a position to which the collimation lens has been moved backward along the light beam traveling.

5. The method of adjusting the mounting position when mounting the lens driving device according to claim 4, wherein either the pitch angle or the roll angle, or both the angles concerning the mounting position are adjusted observing with an autocollimator a light beam outgoing from the opening.

* * * * *